United States Patent [19]

Miller et al.

[11] 4,333,415
[45] Jun. 8, 1982

[54] APPARATUS FOR DISTRIBUTING AND SIFTING JAPANESE STYLE BREAD CRUMBS IN A TYPICAL BREADING MACHINE FOR COATING EDIBLE FOOD PRODUCTS

[75] Inventors: Michael E. Miller, Bellevue; Richard J. Hummel, Sandusky, both of Ohio

[73] Assignee: Sam Stein Associates, Inc., Sandusky, Ohio

[21] Appl. No.: 176,024

[22] Filed: Aug. 7, 1980

[51] Int. Cl.³ ............................................. B05C 19/00
[52] U.S. Cl. ........................................ 118/16; 118/24
[58] Field of Search ..................... 118/16, 24, 312, 13, 118/21, 23; 426/293

[56] References Cited

U.S. PATENT DOCUMENTS

3,547,075  12/1970  Johnson ................................. 118/16
4,128,160  12/1978  Deal et al. ............................ 198/657

Primary Examiner—John P. McIntosh
Attorney, Agent, or Firm—Baldwin, Egan, Walling & Fetzer

[57] ABSTRACT

In a typical breading machine for automatically coating the exterior surfaces of edible products such as for example seafoods, poultry, red meats and vegetables, a method and apparatus for distributing and sifting what is defined in the art as Japanese style bread crumbs which display a wide variation in crumb sizes. The typical breading machine provides for the conveyance of the product to be coated along a conveyance or coating path on a bed of breading placed on the conveyance means at a first location whereby the surfaces of said product which engage said bed are coated with breading. A separate quantity of breading is subsequently presented to the product being conveyed at a second location along the conveyance path whereby the remaining surfaces of the product are coated with breading. The method of this invention and apparatus for producing said method provides for the distribution and then sifting of a single recycled homogenous flow of Japanese style bread crumbs into two separate flows, a first flow having a preponderance of finer particles of said crumbs and a second flow having a preponderance of larger particles of said crumbs, said first flow being directed to the said first location on the conveyance path and said second flow being directed to the said second location on the conveyance path, whereby the individual surfaces of the product may each be engaged with the composition of crumbs best suited to produce an identical coating on all surfaces of the product.

8 Claims, 21 Drawing Figures

Fig 1 PRIOR ART

APPARATUS FOR DISTRIBUTING AND SIFTING JAPANESE STYLE BREAD CRUMBS IN A TYPICAL BREADING MACHINE FOR COATING EDIBLE FOOD PRODUCTS

At the present, in the field of large scale food preparation, a very large volume of food pieces are coated with batter and breading so that they may be cooked by deep fat frying. The food pieces are usually seafoods, poultry, red meats or vegetables. Common batters are made from corn and/or wheat flours, starches, seasonings, and gums plus water, mixed in various proportions as desired by the food processor. Breadings may take many forms, but are usually a dry formulation of grain flours, seasonings and spices. Common breadings may be used in granular form, wherein granules are one-sixteenth of an inch or less in major dimension, or in flour form. Granular breadings are usually termed "free flowing", because they will not pack into clumps, nor will they self-bridge over an opening slightly larger than the granules. Machines for applying such breadings have been used for about three decades.

In about the last decade, a different style of breading, called Japanese style bread crumbs, has become increasingly popular in the United States because of its distinctive "mouthfeel" which can change an ordinary product into a gourmet product. However, the desire to use Japanese style crumbs on products has led to more problems for the food processor. This invention is directed toward the solution of some of those problems.

Japanese style bread crumbs are manufactured by a number of companies, each with its proprietary formula and method of manufacture. Basically, the formulation is primarily a modified wheat flour with small percentages of yeast, salt, sugar, vegetable oil and other additives. In appearance, Japanese crumbs are strikingly different from other breadings. They appear to be shredded white bread which has been thoroughly dried after shredding, so that the particles may be as large as one-half inch in major dimension, or as little as flour size and all sizes in between. Particles are completely random in shape and seldom near spherical. The minor dimension of the large particles is commonly less than one quarter of the major dimension. To further the appearance of being made from white bread, the particles are riddled with holes as would be generated in bread dough by the yeast therein. It may be understood from this description that Japanese crumbs are very delicate, and will not withstand the abuse that standard granular breadings will endure. Japanese crumbs are nearly "free flowing" as previously described, except that they will self-bridge over larger openings than is the case with common granular breadings.

The particle size of Japanese crumbs as previously mentioned varies greatly from large particles to dust, with the greatest volume and weight percentage normally being in large or coarse particles. As with any such mixture of particle sizes of semi-rigid material, the crumbs have a tendency to settle, with smaller particles migrating to the lower level of any layer or pile. Settling is greatly aggravated by any form of vibration. In fact, a bag of new crumbs as received from a manufacturer may vary in density by as much as twenty percent in different sections of the bag.

Finally, Japanese style bread crumbs are much lighter than common granular breading, having a bulk density of approximately twenty pounds per cubic foot versus about forty pounds per cubic foot for common granular breadings. Part of the difference is due to a lower moisture content, about four to six percent in Japanese style crumbs versus the eight to ten percent in common granular breadings. The greater part of the difference is due to the lacy structure of the Japanese style crumbs as described.

FIELD OF THE INVENTION

Applying diverse edible particulate solid to surface coat a solid core of food, which has been first coated with a liquid batter.

PRIOR ART

One of the main problems in the use of Japanese style crumbs is in obtaining a comparable coating on both top and bottom of nearly flat product pieces. Most standard prior art breading machines, like that in FIGS. 1 and 2 of U.S. Pat. No. 4,128,160, and like that of FIG. 3 of U.S. Pat. No. 3,547,075, first form a bottom layer of breading on a moving product belt, onto which layer the battered product pieces to be breaded are placed. The moving belt then carries the product under a falling curtain of breading which covers the top and sides of the product pieces. The moving belt may then pass under a pressure device, which may be a roller or series of rollers, which gently press the top layer of breading onto the product, the pressure also pressing the product onto and into the bottom layer of breading. Excess breading is then removed, generally with vibrators and air curtains, and the coated or breaded product is discharged from the breading machine. Most standard breading machines as described will circulate Japanese style crumbs and will form both top and bottom layers. However, the product pieces breaded in such standard machines will have a great disparity in appearance and "mouthfeel" between top and bottom coatings. The bottom will have mostly large and intermediate particles adhering with few smaller particles and many unbreaded spaces between these particles. The top surface will be thoroughly breaded, but mostly with fines and small particles. This disparity is usually totally unacceptable and this is the main problem to which this invention is directed. The explanation for the disparity is fairly simple and is based upon the foregoing description of Japanese style crumbs. When the bottom layer is formed, some vibration and movement of the crumbs always occurs, causing the smaller particles to settle toward the belt. This leaves only the tips of the larger and intermediate sized particles projecting upwardly through the surface of the bottom layer to receive product. Due to the random shape and lacy structure of the particles, and hence the interlocking effect of the coarser particles, the pressure device cannot press the product far enough into the bottom layer so that fines are touched by the battered product. Hence, few, if any, fines adhere to the bottom of the product. Conversely, when the top coating is formed by the falling curtain of crumbs, both fines and coarse particles reach the product at the same time. However, as the fines cover the battered top of the product, the coarse particles have little chance of touching a maximum area of batter so that they may adhere. Passage under the pressure roll cannot help much because the battered top surface of the product is already covered with fines so that the coarser particles cannot be pressed into further contact with the batter. As the product passes under the air curtain, these tenuously attached coarse particles are usually blown off the product, or they later fall off, because of insufficient adherence to the product.

During the past few years, the assignee of the present application has produced special breading machines for coating food products with Japanese style bread crumbs which reduce the disparity between top and bottom product coatings. The theory of operation of such machines is simple, and the practice is better than anything previously available. It was reasoned that if fewer than normal coarse particles were present in the bottom layer of breading, that product bottom would certainly pick up more fine particles than from a normal conglomeration of Japanese crumbs. In addition, if more than normal coarse particles were present in the top breading layer, then product top would stand a better chance of retaining more coarse particles. In total, the top and bottom coatings would more nearly approach being the same. In practice, a sifter arrangement is installed above the breading hopper to partially separate the breading. The sifted component that contains the highest proportion of fines is directed to supply the bottom layer of breading on the product belt, while the sifted component which contains the highest proportion of coarse particles is directed to supply the top layer of breading over the product. In addition, a further sifter is placed under the curtain forming the top layer, to again separate particle sizes and improve top coverage of the product. These specially modified machines for the application of Japanese style crumbs are so superior to standard machines that their inherent problems have been accepted, or not recognized, until recently. The main remaining problem is this; as a mixture of rigid particles of various sizes pours from a relatively narrow chute to fill a relatively wider hopper, the coarser particles tumble down the surface of the natural angle of repose as far as they can. Then, if a slot is opened in the bottom of the hopper, the portion of the slot closest to the lower edge of the angle of repose may be supplied with a very much higher than normal percentage of coarse particles, while the center portion of the slot may be supplied with a lower than normal percentage of coarse particles. This condition will exist especially when the pile of granules in the hopper barely touches the hopper side walls near the ends of the slot. However, if the pile of particles extends well up the side walls near the slot ends, the large particles may never flow out the slot; instead they may accumulate continuously at the bottom of the angle of repose. In such a special breading machine for Japanese bread crumbs, the level of breading varies as it is used up by coating product so that the top layer of breading may vary considerably in composition, especially at the ends of the slot. This means that product appearance and quality will vary, especially at the edges of the product belt which are under the ends of the top curtain slot.

An additional problem with the prior art special machine for Japanese style crumbs is that due to the configuration of the sifter means and the distribution chutes, the bottom layer may also vary in composition from side to side of the product belt, but for a different reason having to do with distribution of crumbs after sifting.

It may be seen that the handling of Japanese style bread crumbs is a complex problem when all factors are considered, and that prior art has not solved all parts of the problem. This invention is directed particularly to the solution of the remaining problems, whereby the crumbs may be reliably separated into the required components for each of the top and bottom layers, in a manner that insures their use in the way they are originally separated.

SUMMARY OF THE INVENTION

A method and apparatus for use in a breading machine with Japanese style bread crumbs having a significantly large percentage of larger particles (not found in standard granular breading) to establish a controlled homogenous flow of crumbs across a working area and then to sift the flow to cause a larger than normal percentage of fine crumb particles and a smaller than normal percentage of coarse crumb particles to be supplied to a bottom coating layer; and then to cause a larger than normal percentage of coarse crumbs and a smaller than normal percentage of fine crumbs to be supplied to a top coating layer, while also causing the crumbs in both supplies to be used in a "first in, first out" manner. The structures shown are applied to breading machines with a feed hopper and product belt wide enough to handle a plurality of parallel lines of product pieces being coated.

Therefore a primary object of this invention is to provide a method and apparatus for practicing said method so as to insure that the bottom and top product coating layers of breading in a breading machine are each supplied with the proper combination of coarse and fine particles of Japanese style bread crumbs that is best suited to acceptably coat respectively the bottom and top surfaces of product pieces. Another object of this invention is to insure that both bottom and top surfaces of product pieces are completely coated with breading to include an adequate coating percentage of both fine and coarse particles. Another object of this invention is to insure that there is little or no visual disparity between the breading coats on the top and bottom surfaces of product pieces regardless of their position on the transverse width of the product belt.

Additional objects and advantages of the method and apparatus of the present invention will become apparent to one skilled in the art upon reference to the following disclosure of a preferred embodiment wherein:

SPECIFICATION

Figure 1:
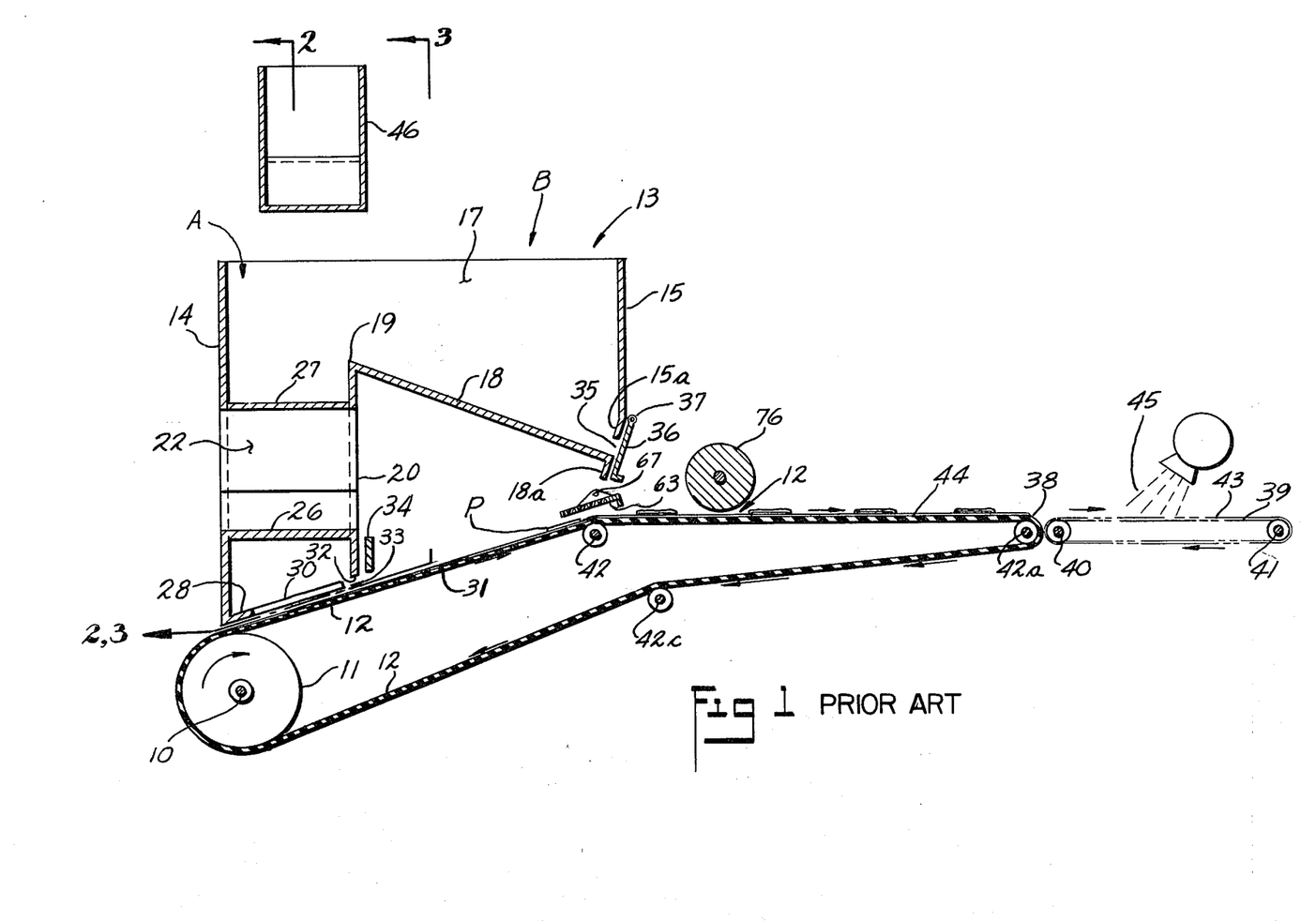
FIG. 1 is a vertical sectional view in schematic form of a typical prior art breading machine with impervious rubber product belt with the sectional plane lying on the longitudinal centerline of the product belt.
Figure 2:
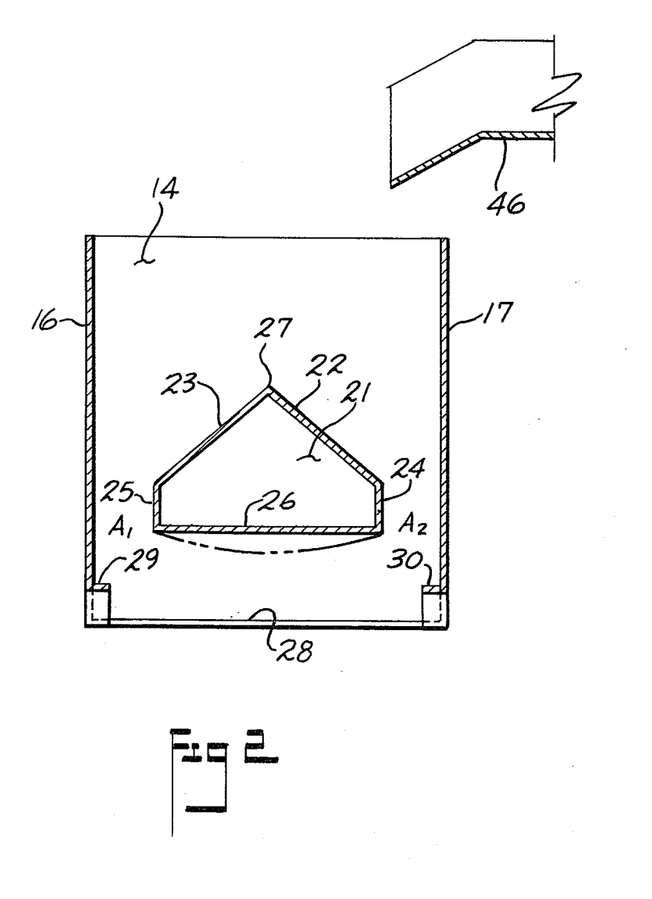
FIG. 2 is a sectional view of the breading hopper only of the typical prior art machine of FIG. 1 taken on line 2—2.
Figure 3:
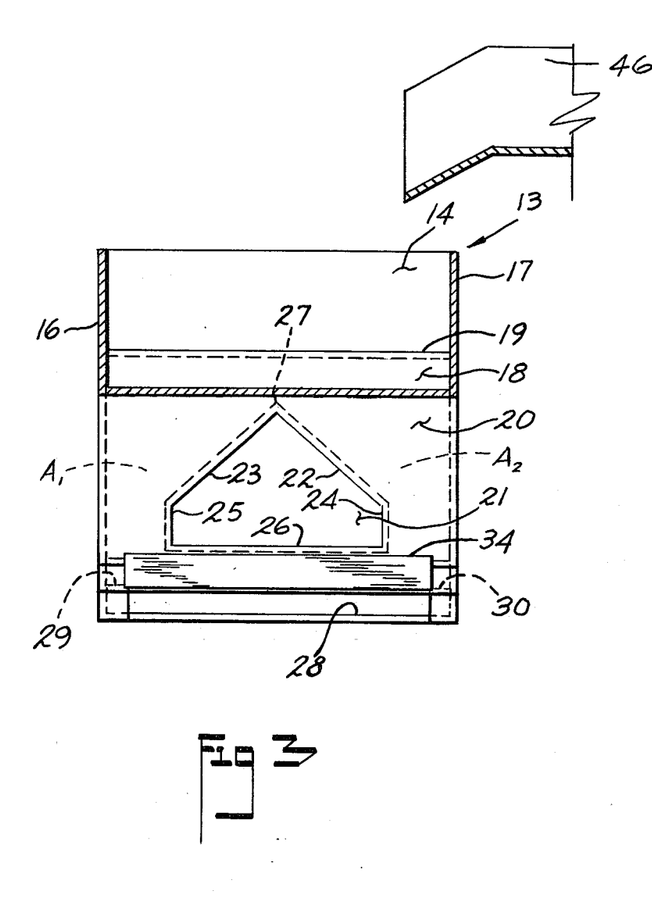
FIG. 3 is a transverse sectional view through the hopper only of FIG. 1 taken on line 3—3.

Referring now to FIGS. 1, 2 and 3, the construction of a typical breading machine of the prior art for granular breading may be seen. An elevated breading hopper similar to that shown in FIGS. 1 and 2 of U.S. Pat. No. 4,128,160 is mounted over a product belt configuration similar to that shown in FIG. 3 of U.S. Pat. No. 3,547,075. A frame (not shown) is used to support all of the following components in their proper operating relationship. A drive shaft 10 carries a drive pulley 11 which drives an endless impervious membrane belt 12, the belt 12 being the main product belt upon which the product to be coated or breaded is placed. The upper and lower runs of the belt 12 are each further supported by at least two idler rollers 42 and 42a which maintain the belt runs in the configuration shown wherein a portion of the upper belt run between pulley 11 and the first roller 42 is upwardly inclined at 31 as it passes under the hopper 13 into which is received the breading.

The upper belt run 44, as seen in FIG. 1, between idler roller 42 and idler roller 42a, extends generally horizontally to provide a product carrying portion along the supporting frame, being spaced from and below one or more pressure devices such as roll 76.

The hopper 13 is somewhat of an inverted L-shape formed by rear wall 14, a front wall 15, side walls 16 and 17, and a sloping bottom wall 18 joined in a ridge 19 with intermediate wall 20. The hopper 13 has two general volumes indicated as section A and section B.

In close proximity to the discharge end 38 of product belt 12, an open mesh wire belt conveyor 39 is supported by drive roll 40 and discharge roll 41 so that the product carrying portion 43 of the wire belt 39 is at the same level as the product carrying portion 44 of product belt 12. One or more air curtains 45, supplied with air by a blower not shown, are mounted over the wire belt conveyor 39, and are operable to blow excess breading off the product top as it passes through said curtains 45.

Not pertinent to the present invention, suitable recovery mechanism (not shown) may be positioned adjacent the wire belt conveyor 39 for recovering excess breading from under wire belt conveyor 39 and elevating this breading to a point above hopper 13 for reuse in breading the product. Any of several such mechanisms may be used. The elevating mechanism may terminate in a discharge spout 46 located above and to one side of hopper 13, in a position so that adequate breading may be supplied to all areas of the hopper 13.

As best seen in FIGS. 1 and 2, the internal volume of the hopper section A is divided into two channels identified as $A_1$ and $A_2$ by means of a gable-like diverter structure comprising sloping roof walls 22 and 23 extending between and connecting with rear hopper wall 14 and intermediate hopper wall 20. Said roof walls are formed integral with side vertical walls 24 and 25 and which connect with bottom wall 26. The roof walls 22 and 23 meet at their upper edge to form the peak or ridge 27 for said diverter which, as seen in FIG. 1, extends between rear hopper wall 15 and intermediate wall 20.

Passageway 21 extends completely through section A of the hopper 13, being bounded by walls 22, 23, 24, 25, 26. A conveyor (not shown) is usually extended through passageway 21 from a batter applicator means (not shown) so that battered product may be deposited upon the lower breading layer on product belt section 31 in the vicinity of belt support roll 42.

As best seen in FIG. 1, the lower edge of rear wall 14 is turned inwardly toward intermediate wall 20 to form a flange 28, and in like manner the lower edges of hopper side walls 16 and 17 in hopper section A are turned inwardly to form flanges 29 and 30 respectively. The flanges 28, 29 and 30 are in close proximity to, but not touching, the upwardly sloping portion 31 of the upper product belt run, their function being to reduce breading leaks between belt 12 and side walls 14, 16, 17 of hopper 13. The bottom of the intermediate wall 20 terminates at 32 a short distance, usually a medium fraction of an inch, above the sloping portion 31 of product belt 12, thus forming a slot 33 therebetween. Slot 33 is fitted with a sliding gate schematically shown at 34 which may be moved vertically downward by any suitable means (not shown) to reduce the height of slot 33 when desired.

As seen in FIG. 1, the front wall 15 of the hopper section B is also turned inwardly and downwardly at 15a and toward the sloping bottom wall 18, the latter likewise being turned downwardly at 18a to define a slot 35 or opening therebetween which may be an inch or more in dimension. A gate 36 swingably attached at 37 to the frame may be adjusted by any suitable means (not shown) to vary the opening of slot 35, said gate also being held or locked in its adjusted position by any suitable means (not shown).

Figure 16:
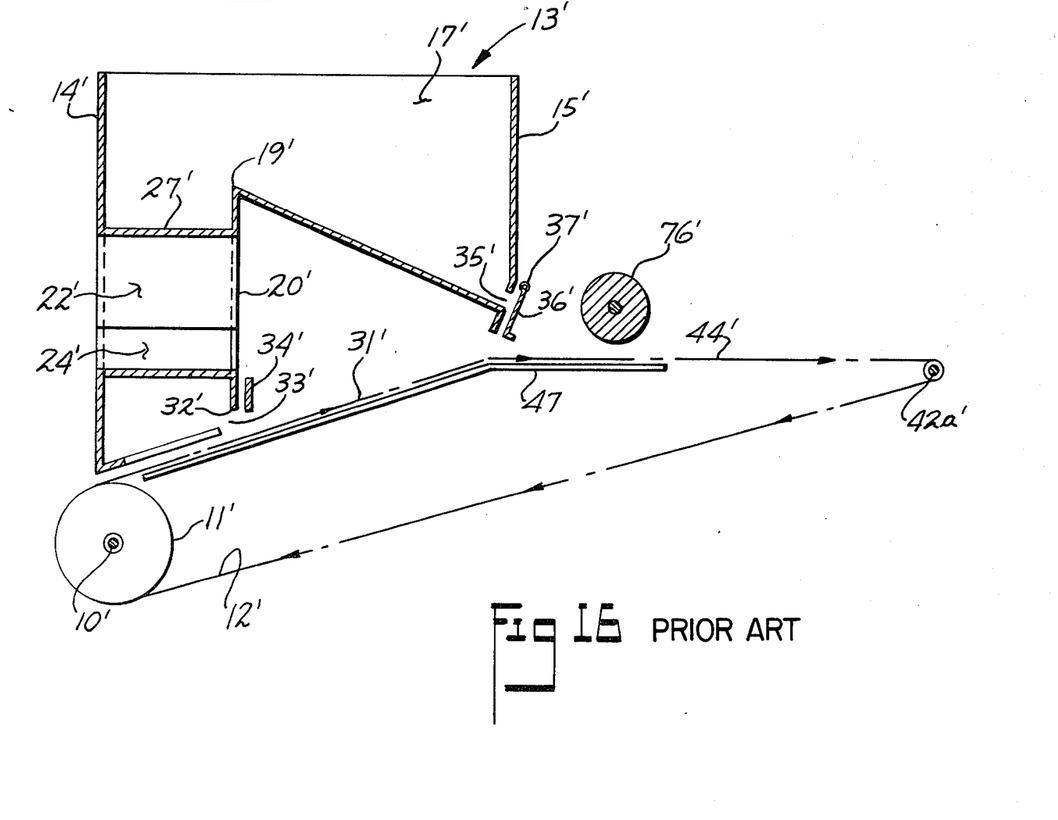
FIG. 16 is a vertical sectional view in schematic form of a typical prior art breading machine with an open mesh wire product belt, with the sectional plane lying on the longitudinal centerline of the product belt.

Referring to FIG. 16, a second arrangement of a typical machine for granular breading is shown for reference. In this arrangement a drive shaft 10' carries belt drive sprockets 11' which drive an open mesh wire belt 12', the belt 12' being supported for all of its inclined portion 31' and for a portion 44' of its horizontal run by a slider plate 47. A single discharge pulley 42a' supports the belt 12' at its discharge end. The hopper 13' above the belt 12' is identical in every respect to the hopper 13 above belt 12 in FIG. 1. The machines of either FIG. 1 or FIG. 16 may be modified to accommodate Japanese style bread crumbs by adding the present invention plus the prior art plate 63 shown in FIGS. 10 and 11.

As previously stated herein, the assignee of the present invention has, in the past few years, constructed and sold special breading machines especially designed to accommodate Japanese style bread crumbs, which machines, although superior to the aforedescribed standard machines, still have inherent problems therein.

Figures 17, 18, 19, 20, 21:
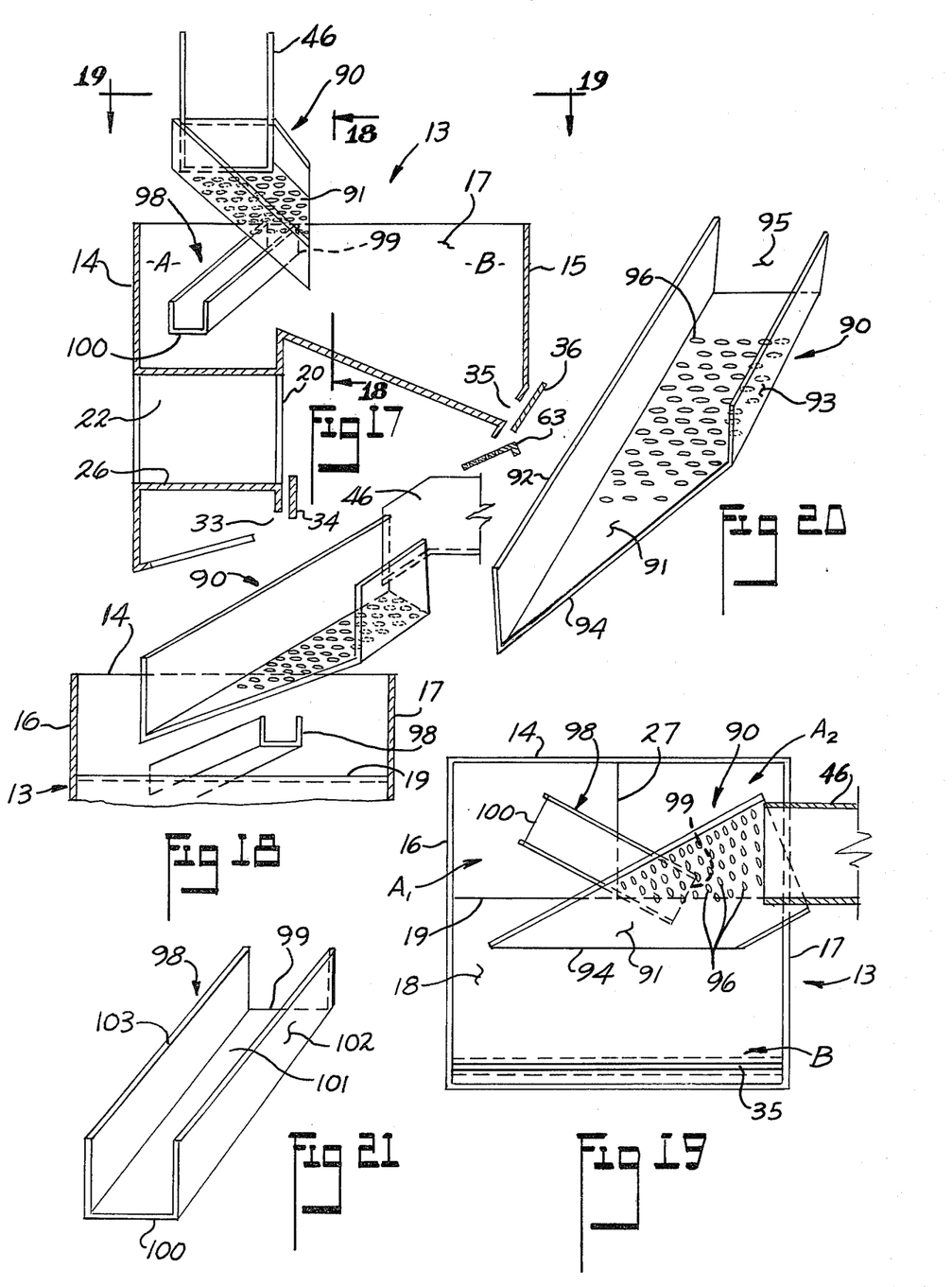
FIG. 17 is a partial vertical sectional view of a part of one of the assignee's previously constructed special breading machines and in particular illustrating the input sifter chutes.
FIG. 18 is a transverse sectional view of FIG. 17 taken on line 18—18 in FIG. 17.
FIG. 19 is a top plan view of the hopper of FIG. 17 taken on the line 19—19 in FIG. 17.
FIG. 20 is an isometric view of the input sifter chute of the machine of FIG. 17.
FIG. 21 is an isometric view of the intermediate chute of the machine of FIG. 17.

Referring to FIGS. 17, 18 and 19, the upper part of said special breading machine is illustrated, specifically the input sifter chute 90 which is attached to input spout 46 so that the bottom wall 91 of said chute 90 slopes downwardly and away from spout 46, an intermediate chute 98 which is mounted so that its one end 99 is under the sifter chute 90 and the other end 100 is at a lower elevation than end 99 and closer to walls 14 and 16 of hopper 13, and a top curtain sifter plate 63 mounted below slot 35 in hopper 13.

The remaining machine structure may be the same as the aforementioned standard or typical breading machine as shown in FIGS. 1 and 16, so that reference characters are identical to those in FIG. 1.

Referring to FIG. 20, the input sifter chute 90 is of somewhat irregular shape having a trapezoidal bottom wall 91, a long upstanding side wall 92, a relatively shorter side wall 93, a discharge edge 94 and an inlet end 95. Bottom wall 91 is perforated for nearly its entire area with holes 96, which may be in any of several patterns. Inlet end 95 is equipped with mounting means (not shown) for attaching this end to discharge spout 46 on a standard breading machine. With side wall 93 being shorter than side wall 92 in their respective longitudinal dimensions, discharge edge 94 forms an acute angle at the junction of bottom wall 91 and side wall 92.

Referring to FIG. 21, intermediate chute 98 is generally rectangular in configuration and has a bottom wall 101, upstanding side walls 102 and 103, and two opposed open ends 99 and 100. Chute 98 is fitted with appropriate mounting means (not shown) to hold it in a desired position in hopper 13.

In operation, recycled breading as previously described will flow from spout 46 onto the bottom wall 91 of sifter chute 90. Due to the slope of chute 90 downward and away from spout 46, breading will slide down the chute 90 toward discharge edge 94. As the breading passes over perforations 96, some will fall through the perforations toward section A of hopper 13, to supply the bottom layer of breading on product belt 12. The portion of breading that falls through perforations 96 contains a higher than normal percentage of fine particles to supply the bottom coating bed and the portion of breading that reaches discharge edge 94 contains a higher than normal percentage of coarse particles to supply the top layer of breading over product on product belt 12.

Intermediate chute 98 is positioned to intercept some of the breading that falls through perforations 96 and directs it into hopper section $A_1$, while the balance of the flow through the perforations falls directly into hopper section $A_2$. The breading in hopper sections $A_1$ and $A_2$ is released as desired by gate 34 to form a bottom layer on belt portion 31. All of the breading flow from chute edge 94 flows into hopper section B to ultimately form the top breading layer on the product.

As previously mentioned, while this prior art specially designed machine is superior to a standard breading machine when used for Japanese style bread crumbs, it still retains major operational problems in that as the mixture of particles of Japanese style bread crumbs of various sizes pours over edge 94 of sifter chute 91 into section B of hopper 13, the flow of particles has a velocity component away from chute 46, and a velocity component away from rear wall 14 of hopper 13. Referring to FIG. 19, this means that the hopper corner between hopper walls 15 and 16 is over supplied with crumbs, while the corner between walls 15 and 17 can be undersupplied with crumbs. The crumbs will seek their natural angle of repose in hopper section B, and the coarse particles will have a tendency to tumble down the angle of repose toward the hopper corner between walls 15 and 17. Then, if the breading machine is operated with too few crumbs in the hopper, a portion of the top flow slot 35 nearest the corn 15–17 will deliver only coarse crumbs and no fines, or no crumbs at all. Even when the hopper has an adequate supply of crumbs, the crumbs supplied to the ends of top flow slot 35 will generally have a higher percentage of coarse particles than those crumbs fed to the central portion of the top flow slot. These top layer supply conditions result in considerable disparity in the appearance of top surface coating of product portions at different positions across the product belt.

In addition, the two hopper portions $A_1$ and $A_2$ are supplied with breading in different manners. Hopper section $A_2$ receives breading falling directly through perforations 96 in bottom wall 91 of sifter chute 90, whereas hopper section $A_1$ receives its breading supply from secondary chute 98 which in turn has intercepted some of the breading falling through the perforations 96 in chute 90. The disturbance to the flow into hopper section $A_1$, caused by the intermediate chute 98, has not been analyzed, but the final effect is that product portions from the $A_1$ side of the product belt 12 will have a different appearance of breading on their bottom surfaces than will the product from the $A_2$ side of the belt.

Figure 11:
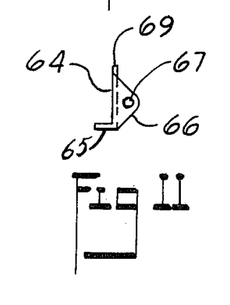
FIG. 11 is a left end view of the sifter plate of FIG. 10.
Figures 12, 13:
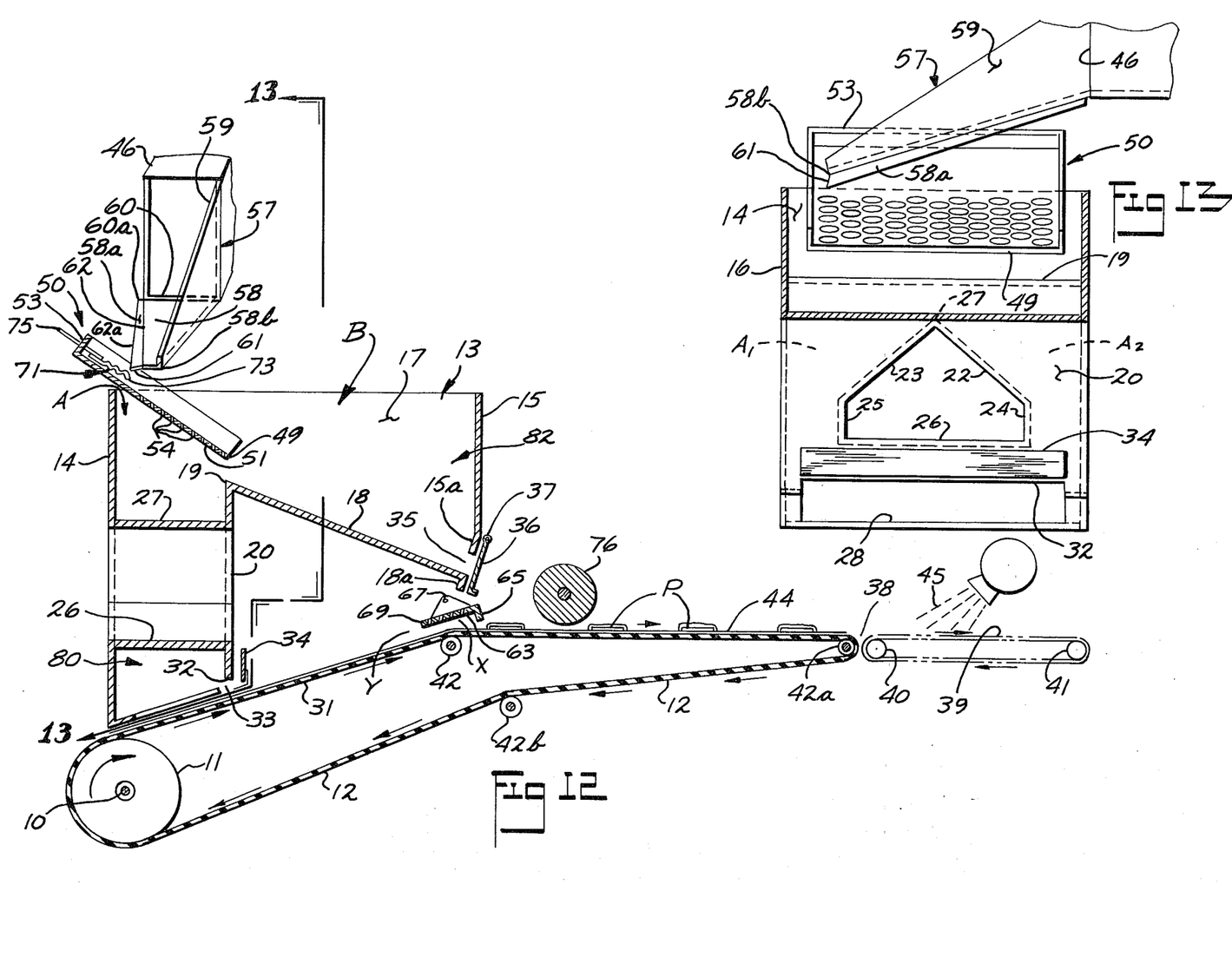
FIG. 12 is a vertical sectional view of a breading machine similar to that shown in FIG. 1, showing in addition, the sifter plates of FIGS. 4 and 10 and the distributor chute of FIG. 7 in position for use of this invention on said machine.
FIG. 13 is a partial transverse sectional view of the breading machine of FIG. 12 and showing the position of the sifter plate of FIG. 4 and the distributor chute of FIG. 7.

Referring now to FIGS. 11 and 12, a prior art top flow sifter plate 63 may be seen. Plate 63 has a partially perforated bottom wall 64, a stiffening flange 65 directed downwardly under one long edge, and two end flanges 66 containing mounting holes 67. A discharge edge 69 completes the perimeter of the plate 63. Perforations 68 are similar in configuration and spacing to perforations 54 in plate 50 which will be described later. The perforated area of bottom wall 64 extends across the long dimension of plate 63, and for one-half to two-thirds of the short dimension starting at discharge edge 69. Plate 63 is mounted in the breading machine frame (not shown) by bolts through holes 67 in such a manner that discharge edge 69 is horizontal, transverse to the direction of product flow on belt 12, and lowermost of all portions of the plate 63, and so that the unperforated portion of the bottom wall 64 underlies the top flow slot 35 in hopper 13. The angle formed by the bottom wall 64 with a horizontal plane may be between 20° and 45°.

Figure 10:
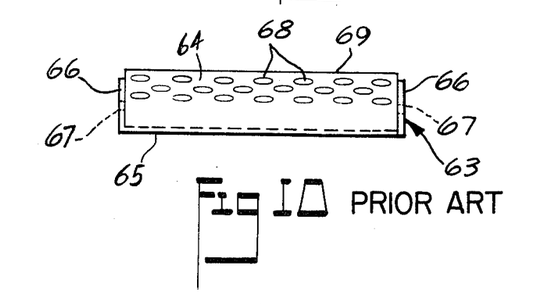
FIG. 10 is a top plan view of a prior art sifter plate used also herein under the top-coating flow of a breading machine hopper.

In operation, Japanese style bread crumbs fall from hopper section B in a curtain through slot 35 in an amount governed by the position of gate 36. As the crumbs reach the unperforated portion of bottom wall 64 of plate 63, they are directed toward the discharge edge 69 of plate 63. The sliding layer of crumbs must pass over perforations 68 in bottom wall 64 where some but not all of the finer particles fall through and most but not all coarser crumbs do not. This further separation of coarse and fine crumbs permits coarse crumbs to cover the top surface of product before the majority of fine crumbs touch the product. However, if the top curtain of breading supplied through slot 35 of hopper 13 is not homogenous throughout the length of slot 35, as the above description shows it seldom is, plate 63 cannot correct any deficiencies. The breading coat on the top surface of the product will frequently vary from side to side of the breading machine as described above.

As heretofore mentioned, it will now be realized by the skilled artisan that the handling of Japanese style bread crumbs is a complex problem when all factors are considered, and that prior art breading machines have not solved all the problems.

The present invention is directed particularly to a novel method and novel apparatus designed to be operable as an addition to a typical breading machine structure to provide a solution to the remaining problems, whereby Japanese style bread crumbs may be reliably separated into the required components for each breading layer, the separated flows of crumbs may be evenly and reliably directed to the supply orifices for each breading layer without further separation of crumb flows, the crumbs may be discharged through these orifices in a reliably "first in, first out" manner, and thus the coated product may have a substantially identical appearance on all surfaces of the product regardless of transverse positioning on the product belt.

Referring now to FIGS. 12 and 13, there is herein shown a typical breading machine which has been modified by the present invention. Components which have heretofore been identified in the description of the typical machine assembly, FIGS. 1–3, will be referred to with the same reference characters.

Referring now to FIGS. 4–9 and 12–15, the present invention consists of providing unique breading distribution and sifting apparatus, that is especially designed for use with Japanese style bread crumbs, for attachment to a typical breading machine structure, whereby a typical breading machine structure so equipped will produce a coated product having smaller and larger breading particles substantially uniformly distributed onto all exterior surfaces of the product.

A distributor chute 57, as best seen in FIGS. 7–9 and 12, has a triangular bottom wall 58 and one side wall 59, together forming a right angled corner, and is interposed between the discharge spout 46 and the sifter plate 50. The edge 60 of the bottom wall 58 of said chute 57 is fitted with proper attachment means (not shown) so that it may be swingably attached to the front of the discharge spout 46. The attachment means need only hold the edge 60 of the chute 57 in proper proximity to the front of the spout 46. Edge 60 of bottom wall 58 is approximately equal in length to the width of the front of spout 46 as seen in FIG. 12. The overall length of chute 57 is slightly less than the width of hopper 13 between hopper side walls 16 and 17 as seen in FIG. 13.

Figure 7:
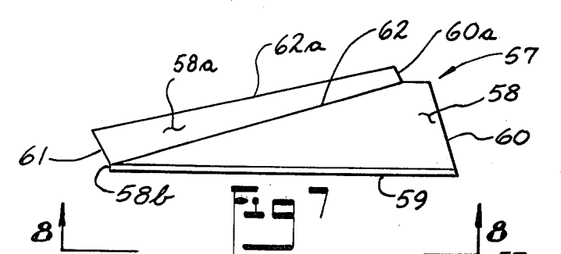
FIG. 7 is a top plan view of a distributor chute, for use in this invention above a sifter plate of FIG. 4.
Figure 8:
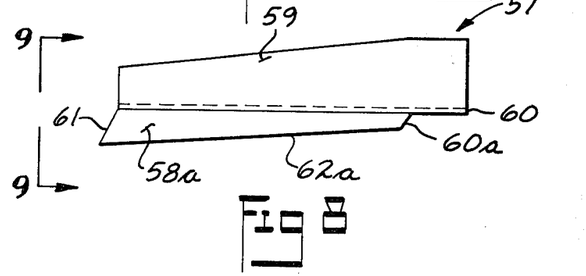
FIG. 8 is a side view of the distributor chute of FIG. 7 taken on line 8—8 of FIG. 7.
Figure 9:
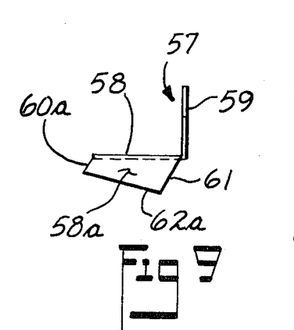
FIG. 9 is a left end view of the distributor chute of FIG. 7 and looking in the direction of the arrows 9—9 in FIG. 8.

Bottom wall 58 is triangular in shape, bounded by edge 60, side wall 59 and edge 62. A flange 58a may be attached to bottom wall 58 along edge 62 with the surface of flange 58a sloping downwardly and away from wall 58 at an angle of about 30° from the plane of wall 58. A flange end edge 61 is about two to three inches long depending upon the width of hopper 13, while flange end edge 60a is about three-quarters the length of edge 61. The discharge edge 62a forms the last side of flange 58a. Flange 58a is sometimes desirable in this configuration to ensure that the breading impact line on plate 71 is parallel to the rear wall 14 of hopper 13 as later described, which is sometimes not the case when flange 58a is omitted. The configuration of side wall 59 may be any desired shape, but is shown as being a non-regular polygon in the present embodiment.

As best seen in FIG. 13, discharge spout 46 is modified as necessary so that its discharge end extends no further toward hopper 13 than the vertically extended plane of hopper side wall 17. As best seen in FIG. 12, distributor chute 57 is shown attached to the spout 46 so that the side edge 62 of bottom wall 58 is substantially parallel to the plane of rear wall 14 of hopper 13, and substantially transverse to the direction of movement of the product along the coating path as defined by the conveyor belt 12. Hopper sifter plate 50 is also shown positioned inside hopper 13 with rear wall 53 higher than frontal edge 49, and so said edge 49 overlaps ridge line 19 of hopper 13 and terminates within hopper section B. False bottom 71 is shown in position inside and over sifter plate 50.

Figures 4, 5, 6:
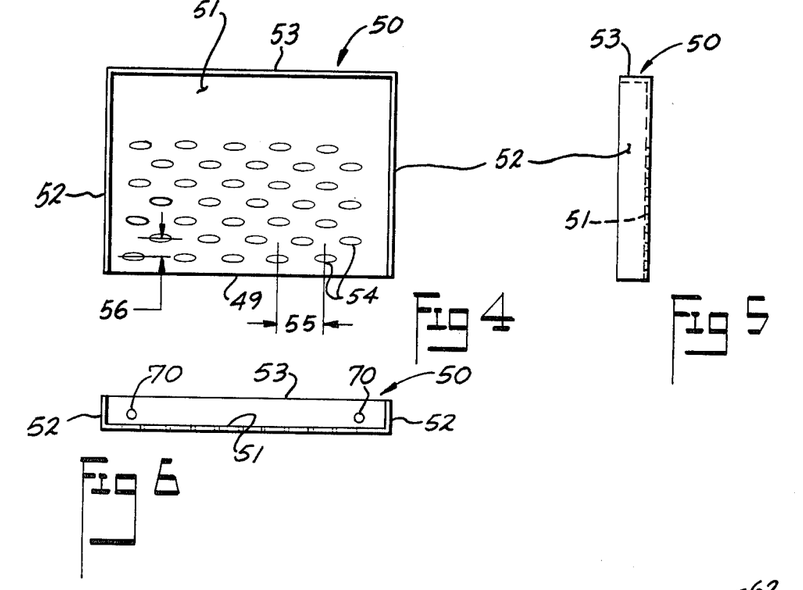
FIG. 4 is a top plan view of a sifter plate for use in this invention above a breading machine hopper.
FIG. 5 is a right side elevation of the sifter plate of FIG. 4.
FIG. 6 is a front view of the sifter plate of FIG. 5.

A hopper sifter plate, identified at 50, is seen to be adjustably mounted on the hopper 13 below the distributor chute 57. Sifter plate 50, as seen in FIGS. 4–6, is generally rectangular in configuration and consists of a partially perforated bottom wall 51 bound on three sides by side walls 52 and back wall 53. The length of back wall 53 is slightly less, about a medium fraction of an inch, than the inside length of rear wall 14 of hopper 13. The length of each side wall 52 is approximately equivalent to about twice the distance between rear wall 14 and intermediate wall 20 of hopper 13. The discharge edge of the sifter plate 50 is defined by edge 49. In the present embodiment of sifter plate 50, the height of side walls 52 and back wall 53 is about two to three inches. The perforations 54 in bottom wall 51 are slots with two parallel sides and ends that are generally semicircular in shape, said slots having an overall width of approximately eleven thirty-seconds of an inch and an overall length of about one inch. The typical lengthwise spacing 55 between the centers of adjacent perforations may be about one and three-eighths to one and five-eighths inches, while the typical sideways or transverse spacing 56 between adjacent perforations may be about three-quarters of an inch to one inch. The slots are arranged in spaced rows, as seen in FIG. 4, wherein adjacent rows are staggered by one-half of dimension 55. The perforated area extends completely across the bottom wall 51 between side walls 52 and from the discharge edge 49 of said bottom wall to about two-thirds to three-quarters of the distance toward the back wall 53. Two holes 70 are formed in back wall 53, about tangent to upper surface of bottom wall 51, and of a diameter sufficiently large to enable the threaded rods 75 of a false bottom plate identified at 71 in FIG. 14 to freely pass therethrough.

Figure 14:
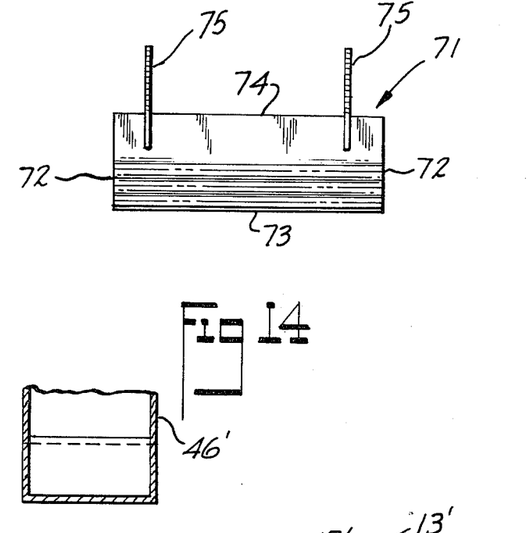
FIG. 14 is a plan view of a false bottom plate for use inside the sifter plate of FIG. 4.
Figure 15:
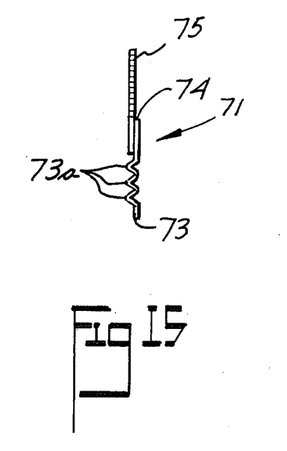
FIG. 15 is a right side view of the false bottom plate of FIG. 14.

Plate 71 is of generally rectangular imperforate shape with two parallel side edges 72, a frontal edge 73 and a rear edge 74. Two threaded rods 75 are attached to the rear edge 74 of said plate so that the free end of each rod 75 projects outwardly from said edge 74 a distance of approximately several inches. The centerlines of rods 75 are parallel to the plane of false bottom 71. The rods 75 are spaced along rear edge 74 of said plate at about the quarter points thereof but spacing is not critical as long as the rods freely slide in holes 70 of sifter plate 50. The length of edges 73 and 74 is slightly less than the distance between the inside surface of side walls 52 of sifter plate 50. The length of side edges 72 is equal and approximately equal to the width of the unperforated part of bottom wall 51 of sifter plate 50 between rear walls 53 and the first-encountered row of perforations 54. Plate 71 is corrugated for approximately two-thirds of its width starting at edge 73. The first bend line is about one-half inch from and parallel to edge 73, and successive bend lines are about one-half inch apart, in alternate directions. Thus the edge view of plate 71 as seen in FIG. 15 shows three ridge lines 73a a small fraction of an inch, about one-eighth to one-quarter inch, above the top surface of plate 71, with ridge lines 73a being about one inch apart. Thus when false bottom plate 71 is placed inside of sifter plate 50 and over the bottom wall 51 with the threaded rods 75 extending through the holes 70 of back wall 53 of plate 50 and with edge 74 of bottom 71 in close proximity to the inside of back wall 53 of plate 50, said plate 71 does not overlie or cover any perforations 54 in plate 50. Plate 71 may be locked in this position by placing locking nuts (not shown) on rods 75. When it is desired to overlie or close off a portion of the perforations 54 in plate 50, the locking nuts (not shown) may be loosened to allow the false bottom plate 71 to be moved to an adjusted position over the bottom wall 51 of plate 50 whereby one or more rows of perforations 54 are covered by said plate 71.

The plate 50 is initially adjusted by means not shown at a preselected angular position with respect to the hopper 13 and then locked in said position. In said locked position, the angle formed by the bottom wall 51 and a horizontal plane may vary approximately between twenty and forty-five degrees.

A prior art top coating plate 63 is mounted below hopper slot 35 as previously described for the prior art special machine for Japanese bread crumbs.

The distributor chute 57 is mounted on the end of discharge spout 46 in a manner (not shown) that permits it to be rotated slightly in a vertical plane, so that wall 58 may be located at a preselected downward slope from spout 46. The angle formed by bottom wall 58 of said chute 57 and a horizontal plane is usually approximately between fifteen and twenty-five degrees.

The operation of a breading machine having the applicants' novel apparatus for distributing and sifting Japanese style bread crumbs will now be described.

Referring particularly to FIGS. 12, 13 and 7, the Japanese style bread crumbs are initially fed by discharge spout 46 into the distributor chute 57 and onto the bottom wall 58 adjacent the edge 60. Because the chute 57 angles downwardly toward and across the hopper 13, FIG. 13, the crumbs slide along the bottom wall 58 and toward the junction 58b thereof where edge 62 meets side wall 59. Because the bottom wall 58 becomes progressively narrower in its width from edge 60 to junction 58b, crumbs must continuously fall over edge 62 of bottom wall 58 toward the hopper 13, edge 62 being parallel to the plane of the back wall 14 of hopper 13, and the plane of back wall 14 being at right angles to the longitudinal travel of belt 12. As crumbs fall over edge 62, they enter upon the upper surface of flange 58a when used. Flange 58a, being inclined downwardly and away from edge 62 by about 30°, guides these crumbs further toward the rear wall 14 of hopper 13 than if they were allowed to fall freely from edge 62. As previously mentioned, edge 60a of flange 58a is shorter than edge 61 of flange 58a, so that the first crumbs to fall over edge 62 of wall 58 receive less guidance by flange 58a than do the last crumbs to fall over edge 62. With these parameters, a substantially even distribution of crumbs is accomplished across the complete width of plate 50 between hopper side walls 16 and 17. The shape of flange 58a further insures that the falling curtain of crumbs from edge 62a of flange 58a will impact on plate 71 in a line which is horizontal and lies in a plane parallel to rear wall 14 of hopper 13. Further, because variations are often experienced between different manufacturers of breading crumbs, and also because the overall condition of breading crumbs vary during their use, the angulation of the distributor chute 57 downward and away from spout 46 may be varied by means not shown to maintain an even distribution of crumbs for any condition of crumbs. As the impact line of crumbs on plate 71 is both horizontal and parallel to rear wall 14 of hopper 13, it may be seen that all crumbs will later be subjected to the same sifting action regardless of their position on the transverse width of sifter plate 50.

It will be understood that flange 58a may be omitted in some embodiments of this invention and that crumbs may then flow directly from edge 62 of chute 57 toward false bottom plate 71. Flange 58a is a refinement to chute 50 which slightly improves the crumb flow to plate 71, therefore flange 58a is used when that slight improvement in crumb flow to plate 71 is essential to the proper functioning of the breading machine. The factors affecting the use of flange 58a are the breading recirculation apparatus used to discharge breading from spout 46, and the length and transverse width of section A of hopper 13. Nominally, the larger hopper 13, the less need for flange 58a.

As the crumbs fall onto false bottom plate 71, which is inclined like plate 50, they slide down the plate 71 toward discharge edge 73, but first they must pass over the corrugations 73a in plate 71 before reaching edge 73. These corrugations have the effect of slightly lifting and dropping the crumbs to agitate them, the agitation helping to settle the finer particles toward the bottom of the layer sliding across plate 71. Thus, when the sliding layer of crumbs crosses discharge edge 73 of plate 71 and reaches sifter plate 50, the finer particles are more apt to be sifted out as the layer crosses the perforations 54 in plate 50. The crumbs thence slide along the surface of the bottom wall 51 of said sifter plate 50, FIGS. 4 and 12, and toward its front edge 49. However, in moving toward said front edge 49, the crumbs pass over the perforations 54 in the bottom wall 51 whereby a major percentage, but not all, of the finer crumb particles along with some large or coarse particles fall through said perforations and into the rear section A of the hopper 13. Likewise, a major percentage, but not all, of the larger or coarse crumb particles along with some finer particles reach the front edge 49 of the sifter plate 50 and fall into the front section B of the hopper 13.

The ratio between finer particles and coarser particles falling into either section A or B of hopper 13 may be variably controlled by adjusting the angulation of the sifter plate 50 which correspondingly varies the velocity or the rate of passage of the breading crumbs over the bottom wall 51 of said sifter plate 50. A steep angle and higher speed will increase the proportion of fine crumbs falling into section A, while a shallower angle will decrease the proportion of finer particles falling into section A.

As will also be realized, by adjusting the imperforate plate 71 so that it extends over a greater or lesser area of the underlying perforations 54 in sifter plate 50, the total quantity of crumbs falling through said perforations in said sifter plate 50 may be variably controlled.

As previously mentioned, the perforations 54 in the sifter plate 50 are preferably constructed within a critical range of dimensional parameters as identified hereinabove, which have been found to adequately accommodate the several crumb variations between different Japanese style crumb manufacturers so as to provide for optimum coating of the product.

The crumbs that fall through the perforations 54 in the sifter plate 50 fall into hopper section A as seen in FIGS. 12 and 13 and are then diverted by diverter structure 22, 23, into hopper sections $A_1$ and $A_2$ to become part of the bottom-coating layer supply 80, which is bounded on its underside by moving belt portion 31. It may now be understood that the crumbs fall into each hopper section $A_1$ and $A_2$ in an identical manner from perforations 54 in plate 50, and thus flow thence to the bottom coating supply 80 in an identical manner, so that the bottom coating layer formed on product belt portion 31 is essentially uniform throughout its transverse width. Additionally, it may be understood that because the percentage of coarse crumbs supplied to hopper section $A_1$ and $A_2$ can be closely controlled by the angulation of sifter plate 50 as previously described, then the appearance of the bottom surface coating on product pieces may be very closely controlled, with more or less coarse particles as desired, yet with adequate coverage by fine particles. As previously noted, whatever coarse particles are allowed to reach the bottom coating layer from sifter plate 50 will readily adhere to the product bottom, while restriction in the number of coarse particles will permit the fines also to adhere to the product bottom. The control of the crumb supply to the full width of the product belt means that separate product pieces will present essentially identical appearance in their bottom coating regardless of their position in the transverse width of the product belt 12. For the reasons described in this paragraph, the method and apparatus of this invention has greatly improved the reliability and consistency of the Japanese style bread crumb coating on the bottom surface of product pieces, compared to the coating obtained by the use of the prior art Japanese style bread crumb method and apparatus as previously described.

The bread crumbs which discharge over the discharge edge 49 of sifter plate 50 fall beyond dividing ridge 19 into hopper section B to thus form a top coating supply 82. It may be understood that because no crumbs are directed sideways toward either hopper wall 16 or hopper wall 17, that the entire transverse length of top curtain slot 35 is equally supplied with the same composition of crumbs. Thus, when gate 36 is opened to permit discharge of crumbs through slot 35, the entire transverse width of prior art plate 63 is supplied with an identical composition of crumbs. This condition will obtain regardless of whether the hopper section B is over filled or is nearly empty. The prior art plate 63 may now function continuously as originally envisioned.

As previously described, the crumbs which fall onto the unperforation portion of sifter plate 63 from slot 35 slide down the bottom wall 64 of plate 63 toward discharge edge 69. As the crumbs pass over perforations 68 in plate 63, some but not all of the finer particles fall through perforations 68 to form a curtain of fine crumbs in area or zone X seen in FIG. 12, to coat product passing therethrough on product belt section 44.

The larger size particles, which are less prone to fall through perforations 68, fall over plate edge 69 of plate 63 toward belt run 31 as a curtain of breading in area or zone Y, which area or zone Y is upstream along product belt 12 from the area or zone X.

This discharge pattern of breading crumbs, wherein first the large crumbs are deposited upon the product pieces P in zone Y to permit the large crumbs to adhere well to the fresh battered top surface and then the finer crumbs are deposited upon the product pieces P in zone X to fill the voids between the large particles, is the same pattern used in the prior art breading machine for Japanese style bread crumbs as previously described. However, the method and apparatus of this invention insures that all parts of the entire transverse width of product belt 12 may be supplied with an identical composition and quantity of crumbs almost regardness of the quantity of crumbs in hopper section B. Therefore the top surfaces of product pieces P may be identically coated with crumbs regardless of their position in the transverse width of product belt 12.

It may now be understood how the applicants' breading distribution apparatus can ensure a more reliably regular and acceptable coating on all sides of product pieces, when used with Japanese style bread crumbs. The breading flow from discharge spout 46, which may be up to ten cubic feet per minute depending upon machine width and belt speed, is made up of a thoroughly mixed conglomeration of all sizes of particles which are discharged onto distributor chute 57. As the breading slides down bottom wall 58 of chute 57 and falls off edge 62a of flange 58a onto plate 71, or falls off edge 62 directly onto plate 71 as previously described, there has been very little chance for the particles to separate in any way. Thus, the curtain of breading which falls off edge 62a or 62 is essentially constant in composition of particles throughout the length of edge 62a or 62 respectively. A sample taken at one point along edge 62a or 62 is essentially identical to a sample taken at any other point at the same time. This means that the entire width of the hopper 13, about equivalent to the length of edge 73 of plate 71, is supplied with the same proportion of large and small particles.

As the breading then slides across the upper surface of bottom wall 51 of plate 50 in a layer about one-quarter to one-half inch thick, all of the layer passes over the same pattern of holes 54 at the same speed. Thus, the breading which falls through the holes is of a nearly identical composition across the entire width of hopper section A, sections $A_1$ and $A_2$ receive equal quantities of an identical conglomeration of particles in an identical manner, and all portions of belt section 31 will have an essentially identical composition of bread particles thereon.

The portion of breading which enters hopper section B from sifter plate edge 49 is essentially identical in composition at all points in the length of edge 49. As this breading slides down hopper wall 18, any separation of breading into large and small particle components is of no consequence, because whatever breading enters hopper section B first must leave first through gate 35.

In addition, the entire length of slot 35 is supplied with an identical composition of crumbs, therefore the entire transverse length of prior art plate 63 is supplied with an identical flow of crumbs through slot 35. Prior art plate 63 can now perform its function as originally envisioned, and all product top surfaces will be coated in the same manner regardless of product position on the transverse width of belt 12. The method and apparatus of this invention comprising the distribution and then sifting of Japanese style bread crumbs has proven superior to the prior art method and apparatus consisting of sifting of crumbs prior to distribution.

In summation, proper distribution and sifting of Japanese style bread crumbs by this applicants' method and apparatus incorporating distributor chute 57, false bottom plate 71 and sifter plate 50 insure that a typical breading machine equipped with these additions may reliably coat all surfaces of product pieces with an identical composition of such crumbs.

What is claimed is:

1. In a breading machine having a conveyor means for moving a plurality of parallel lines of product to be coated with breading material along a breading or coating path and hopper means wide enough to include said path for discharging breading material at a plurality of zones along said path and wherein said hopper means is operable to discharge breading material onto said conveyor means to form a bottom coating bed upon which the batter coated product to be bread coated is laid whereupon breading material in said bed adheres to the surfaces of said product contacting said bed, and wherein said hopper means is operable to subsequently discharge breading material onto the remaining product surfaces of said product and thus effectively to coat the exterior surfaces of said product with breading; the improvement for efficiently using Japanese style bread crumbs which display a wide variation in crumb sizes as the breading material comprising distribution means disposed at the feed input of said hopper means to intercept an input flow of a normal composition of said Japanese style bread crumbs from said input flow and operable to provide a substantially even distribution of said normal composition of particles of said crumbs in said input flow across the width of said hopper means in a plane transverse to the direction of travel of product along said coating path, and sifter means disposed between said distribution means and said hopper means and operable to receive said even distribution of said normal composition of particles of said crumbs and also operable to separate said normal composition of said crumbs into a first flow substantially composed of a higher than normal percentage of finer particles of said crumbs mixed with a lower than normal percentage of coarser particles of said crumbs and a second flow substantially composed of a higher than normal percentage of coarser particles of said crumbs mixed with a lower than normal percentage of finer particles of said crumbs, said first flow being directed into a first portion of said hopper means to supply said bottom coating bed on said conveyor means and said second flow being directed into a second portion of said hopper means to supply crumbs to coat said remaining surfaces of said product, whereby each surface of said product may be presented with a well controlled flow of said crumbs in the composition of larger and smaller particles best suited to coat the individual surfaces of said product, and whereby all surfaces of all product pieces may present a nearly identical finished appearance.

2. In a breading machine as defined in claim 1, said distribution means comprising a distributor chute disposed over said sifter means with said chute and said sifter means extending in a direction generally transverse to the direction of movement of product along said coating path, and said distributor chute having means to provide a substantially even distribution of different sizes of particles of said crumbs onto and across the entire transverse dimension of said sifter means.

3. In a breading machine as defined in claim 2, said distributor chute having a crumb carrying floor plate of triangular configuration defined by a relatively short open infeed end and a relatively long closed side edge and a relatively long open discharge side edge, with said discharge edge lying in a plane substantially perpendicular to the direction of movement of product along said product path, with the plane of said floor plate forming an acute angle with a horizontal plane, and with said open infeed edge lying in a horizontal plane higher than any other part of said floor plate.

4. In a breading machine as defined in claim 3, said acute angle formed by said floor plate with a horizontal plane having the capability of being adjusted to and locked at any value between fifteen and twenty-five degrees.

5. In a breading machine as defined in claim 1, said distribution means consisting of a triangular floor plate having a relatively short open infeed end and a relatively long closed side edge and a relatively long open discharge edge with said discharge edge lying in a plane substantially perpendicular to the direction of movement of product along said coating path, said discharge edge extending across substantially the entire width of said hopper means, and said floor plate being inclined downwardly away from said input end sufficiently to permit said input flow to be distributed evenly and completely across said hopper means.

6. In a breading machine as defined in claim 5, said sifter means comprising a plane sifter plate having three side walls and an open discharge edge lying in a plane transverse to the direction of travel of product along said coating path, said sifter plate being inclined relative to a horizontal plane so that said discharge edge is horizontal and lower than all other parts of said plate and said relative inclination is downward in the direction of travel of product along said coating path, said sifter plate having a plurality of parallel rows of through openings, said parallel rows being about three-quarters to one inch apart, said parallel rows being also parallel to said discharge edge and covering approximately two-thirds to three-quarters of the area of said sifter plate, each of said openings having two parallel sides about eleven thirty-seconds of an inch apart and having semicircular ends with an overall length of each of said openings being about one inch, said openings in each row being longitudinally spaced about one and three-eighths to one and five-eighths inch center to center, adjacent rows of said openings being staggered, and means for adjusting the angle of inclination of said sifter plate between twenty and forty-five degrees relative to the horizontal.

7. In a breading machine as defined in claim 6, a false bottom plate to lie loosely within the said three side walls of said plane sifter plate, said false bottom plate covering only the unperforated portion of said plane sifter plate when said false bottom plate is in a first position nearly touching all of said three side walls, and said false bottom plate covering one or more of said parallel rows of through openings in said plane sifter plate when said false bottom plate is in a variable second position closer to said discharge edge of said plane sifter plate.

8. In a breading machine as defined in claim 7, said false bottom plate having several parallel rows of shallow corrugations spaced about an inch apart beginning at the lowermost edge of said false bottom plate, said lowermost edge being closest to said discharge edge of said plane sifter plate when said false bottom plate lies loosely within said three side walls of said plane sifter plate.

* * * * *